United States Patent [19]

Stites, III

[11] Patent Number: 4,797,949

[45] Date of Patent: Jan. 10, 1989

[54] SUPERVISORY CONTROL OF MOBILE TELECOMMUNICATIONS

[75] Inventor: George M. Stites, III, Hopatcong, N.J.

[73] Assignee: G. M. Holding Corp., Sparta, N.J.

[21] Appl. No.: 857,943

[22] Filed: May 1, 1986

[51] Int. Cl.[4] .................. H04B 1/06; H04B 1/10
[52] U.S. Cl. .................. 455/230; 455/200; 455/232; 455/233; 455/349; 455/352; 455/355
[58] Field of Search .............. 455/151, 186, 200, 230, 455/232, 233, 349, 352, 353, 354, 355, 143, 58, 63

[56] References Cited

U.S. PATENT DOCUMENTS

| | | | |
|---|---|---|---|
| 4,070,628 | 1/1978 | Funabashi | 455/143 |
| 4,085,366 | 4/1978 | Padgett | 455/63 |
| 4,131,851 | 12/1978 | Martiny et al. | 455/349 |
| 4,297,726 | 10/1981 | Nicholson et al. | 455/349 |
| 4,494,244 | 1/1985 | Arndt | 455/58 |
| 4,509,210 | 4/1985 | Kohn | 455/349 |
| 4,531,232 | 7/1985 | Sakurai | 455/352 |
| 4,551,854 | 11/1985 | Rutty | 455/58 |

*Primary Examiner*—Michael A. Masinick
*Attorney, Agent, or Firm*—Lerner, David, Littenberg, Krumholz & Mentlik

[57] ABSTRACT

A telecommunications system including a mobile unit is protected from operator-induced disruption by disabling the operator-adjustable controls of the mobile unit and fixing the operating parameters of the mobile unit. A supervisory apparatus incorporating supervisory circuit elements replacing the adjustable circuit elements associated with the operator-adjustable controls may be plug-connected between the main chassis and the control head of the mobile unit.

11 Claims, 2 Drawing Sheets

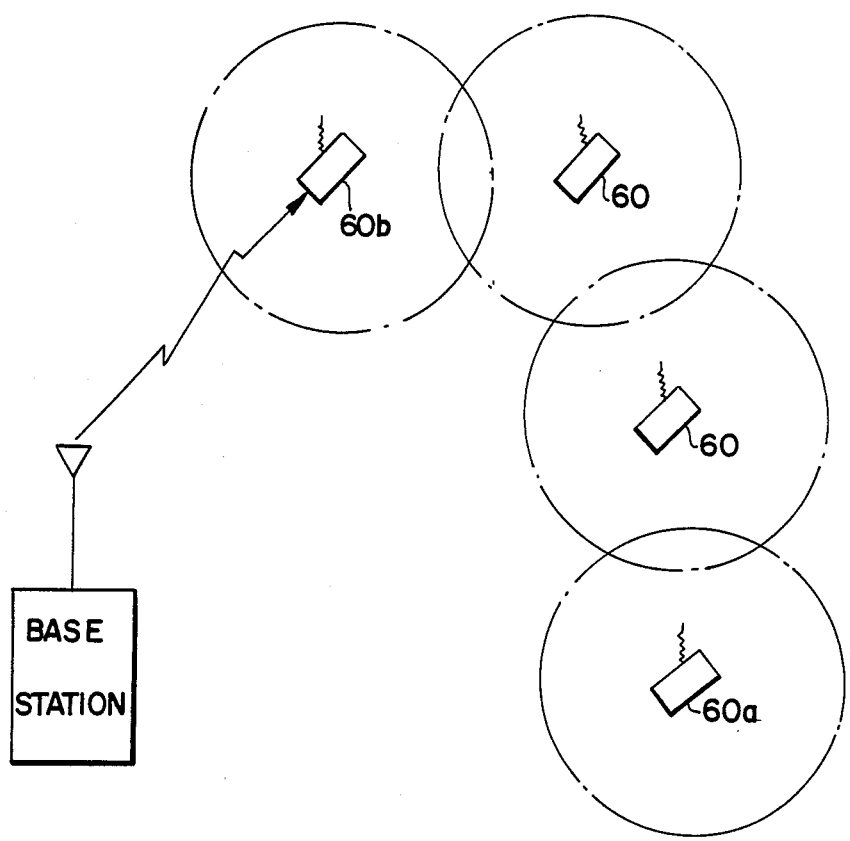
F I G. 2

SUPERVISORY CONTROL OF MOBILE TELECOMMUNICATIONS

The present invention relates to telecommunications systems and more particularly relates to supervision of a telecommunications system including one or more mobile units.

BACKGROUND OF THE INVENTION

Telecommunications systems including mobile units such as portable and vehicle-mounted transceivers, are employed in business and government activities to provide communication between management and field personnel. For example, buses may be equipped with transceivers for driver communication with bus dispatchers. Likewise, the vehicles used by salesmen and service technicians may be provided with transceivers for communication with home office personnel.

Such mobile communications systems generally provide reliable communication, and the reliability of these sytems has improved with recent advances in electronics technology. Despite such improvements, however, there are still considerable incidents of missed communications. Thus, field personnel such as bus drivers and service technicians, sometimes fail to receive communications from the base station or home office and hence do not respond when called. Such missed communications have been a particularly vexing problem both for organizations using the mobile telecommunications systems and for suppliers of the equipment employed in such systems. Oftentimes, the organization using the system will encounter difficulties even though all the equipment functions properly when tested by the supplier.

SUMMARY OF THE INVENTION

The present invention incorporates the realization that a significant portion of the communications difficulties encountered with mobile telecommunications systems are related to the operator-adjustable controls on the mobile units. The operator-adjustable controls of the unit, typically include an on-off switch, a volume control, and a squelch control and may also include a frequency selector and a tone function control. These operator-adjustable controls may be inadvertently misadjusted, rendering the unit inoperative. Also, unenthusiastic field workers seeking to avoid control by management may willfully misadjust the controls to render the mobile unit inoperative. An unenthusiastic field worker may simply fail to respond to communications even though the unit is operating and may attempt to excuse his failure to respond by claiming that the mobile unit was not working properly. The present invention provides solutions to these problems.

One aspect of the present invention provides a method of supervising a telecommunications system including a mobile unit having operator-adjustable controls for altering the operating parameters of said mobile unit. The method preferably comprises the steps of disabling the operator-adjustable controls and fixing the operating parameters of the mobile unit to maintain the mobile unit in operation despite attempted adjustment of the operator-adjustable controls. The operator-adjustable controls of a typical mobile telecommunications transceiver may include an on-off control, a volume control, and a squelch control. Thus, the on-off control may be connected to a switch movable between open and closed positions, and the squelch and volume controls may be connected to variable resistors. The parameters normally associated with these adjustable circuit elements may be fixed by connecting supervisory circuit elements, not adjustable by means of the normal controls, in place of these adjustable circuit elements. For example, a continuously "on" or closed jumper, and resistor of fixed value can be connected in place of an on-off switch and variable resistors, respectively. Where the operator-adjustable controls of the mobile transceiver include a frequency control and/or a tone function control, these may be disabled in similar fashion.

As the operating parameters of the unit are fixed, missed communications caused by misadjustment of the operator-adjustable controls cannot occur. Reliability of the overall system is thus markedly improved. Actual communications failures due to control misadjustment are eliminated. Because the operating characteristics of the mobile unit remain the same at all times, test operations can establish to a reasonable certainty that the unit remained in operation at all times between the tests. Accordingly, field workers are discouraged from falsely reporting communications failure as an excuse for their own failure to respond to calls.

In a variant of the method, where the system includes a plurality of mobile units for use under a plurality of different conditions, the fixing step may include the step of fixing the operating parameters of different ones of the mobile units at a different values to adapt the mobile units for operation under such different conditions. These different conditions may include, for example, operation on different channels or operation in different geographic areas. Thus, where the operator-adjustable controls of each mobile unit include a channel selector and where different mobile units are to be operated with base stations on different channels, the channel selection of different mobile units may be fixed at different values so as to associate each mobile unit with the proper base station channel. Also, the different conditions may include operation in different geographic areas. Where some units are to be operated relatively close to the base station and some relatively far from the base station, the squelch levels of the units to be operated far from the base station may be fixed at a relatively low value to allow reception of relatively weak signals from the base station, whereas the squelch level of the other mobile units may be set at a relatively high value.

A further aspect of the present invention includes supervisory apparatus for a mobile telecommunications unit having operator-adjustable controls for altering the operating parameters of the unit. The apparatus preferably comprises disabling means for disabling the operator-adjustable controls and fixing means for fixing the operating parameters of the unit so as to maintain the unit in operation despite adjustment or misadjustment of the controls. The apparatus may also inlude override means for selectively overriding the disabling means and bypassing the fixing means so as to re-enable the operator-adjustable controls, and lock means for preventing actuation of the override means by unauthorized individuals. Thus, where supervision is not required, the actuation of the override means will restore the operator-adjustable controls of the mobile unit to full function.

The apparatus may be particularly adapted for use with mobile communications units including both a main chassis holding the operative circuit elements of the unit and a separate control head. In such apparatus, the operator-adjustable controls ordinarily are mounted on the control head, and the adjustable circuit elements such as switches, variable resistors, and the like associated with the operator-adjustable controls may be mounted within the control head. The control head typically is connected to the main chassis by a multicontact control head connector attached to the control head, as by a cable, and a mating multicontact connector main chassis attached to the main chassis. The preferred apparatus according to the present invention, for use with mobile units including the aforementioned control head arrangement, may include a supervisory circuit housing. A multicontact supervisory/main connector, adapted for engagement with the main chassis connector, and a supervisory/control head connector, adapted for engagement with the control head connector. Thus, the supervisory apparatus may be connected between the control head and the main chassis with the supervisory/main connector engaged with the main chassis connector, and the control head connector engaged with the supervisory/control head connectors. In the normal condition of the supervisory apparatus, the adjustable circuit elements in the control head are isolated from the operative elements of the mobile unit in the main chassis, and supervisory circuit elements in the apparatus are connected to the operative elements of the unit in the main chassis. The override means is actuated, the supervisory circuit elements are disconnected from the supervisory/main connector, and appropriate contacts of the supervisory/control head connector and the supervisory/main connector are interconnected. Thus, the adjustable circuit elements in the control head are connected to the operative elements of the unit in the main chassis.

Supervisory apparatus according to preferred embodiments of the present invention thus may be readily used with common mobile communications units. Supervisory apparatus according to the preferred embodiments of the present invention can be installed merely by unplugging the control head connector from the main chassis, plugging the supevisory/main connector into the main chassis, and plugging the control head connector into the supervisory/main connector. The plug connection between the supervisory apparatus, and main chassis may be physically secured, as by locking members or may be provided with appropriate seals to reveal any attempted disconnection.

BRIEF DESCRIPTION OF THE DRAWINGS

FIG. 2 is a schematic view depicting operation of a mobile communications system including a base station and a plurality of vehicles as illustrated in FIG. 2.

DETAILED DESCRIPTION OF THE PREFERRED EMBODIMENTS

Figure 1:
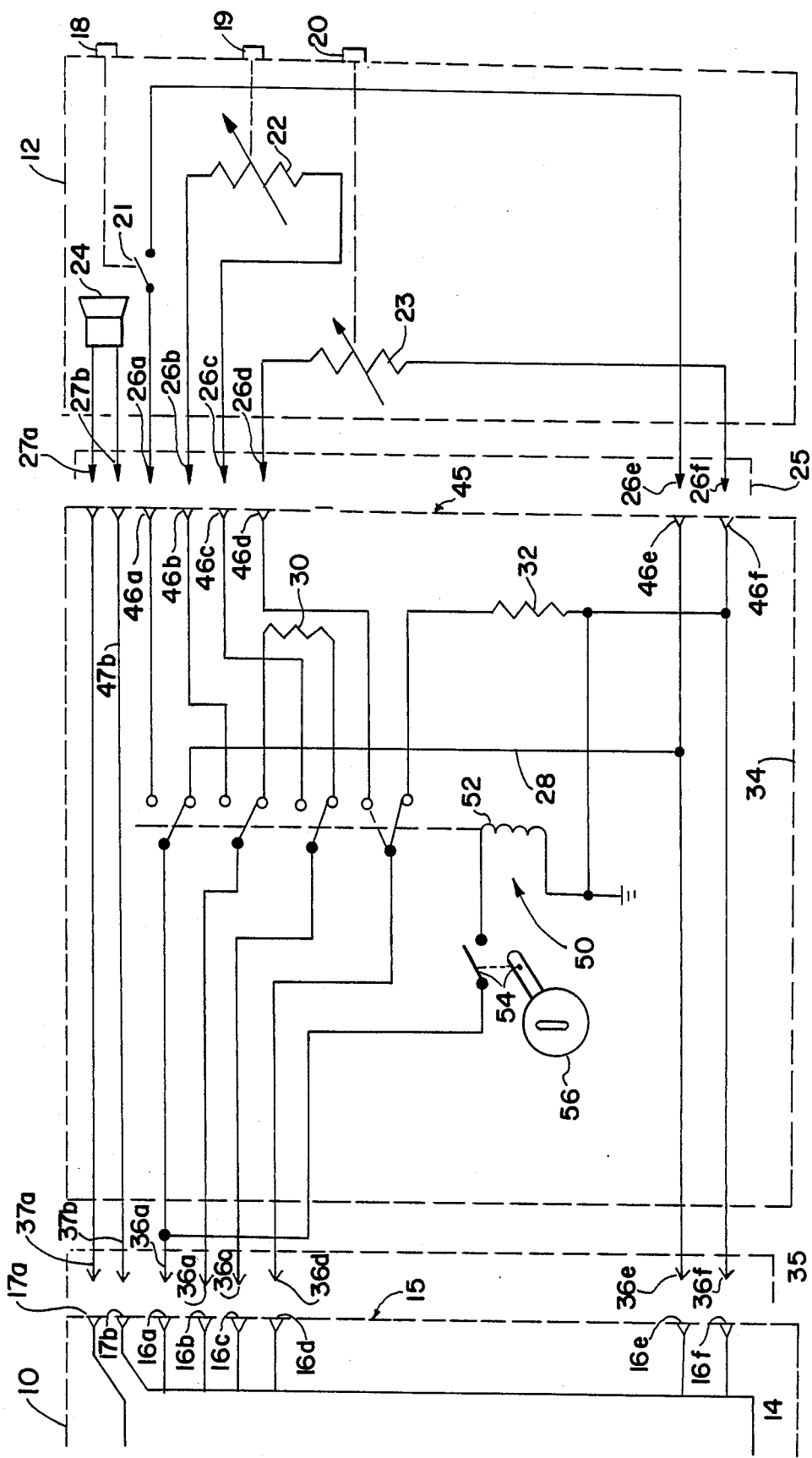
FIG. 1 is a schematic diagram of supervisory apparatus according to one embodiment of the present invention, in conjunction with a typical mobile communications unit.

The mobile communications unit partially illustrated in FIG. 1 is a standard two-way radio transceiver of the type sold under the name Midland trunk mounted transceiver, and under the designation "type 70-665B transceiver." The transceiver includes a main housing or chassis 10 and a control head 12. Operative circuit elements of the transceiver, generally indicated by block 14, are mounted within the main chassis 10. The main chassis is provided with a main chassis connector 15, in this case a multicontact receptacle including plurality of, female main contacts 16a–16f and additional main contacts 17. The operator-adjustable controls of the transceiver, including on-off knob 18, volume control knob 19 and squelch control knob 20 are mounted on control head 12. The associated adjustable circuit elements, including on-off switch 21, volume control variable resistor 22, and a squelch control variable resistor 23 are mounted within the control head. Additional circuit elements, unrelated to the operator-adjustable controls, such as loudspeaker 24, are also mounted in the control head. The control head is provided with a cable extending from the head. Control head connector 25 is mounted at the end of such cable and hence is attached to the control head. The control head connector 25 is a male plug, adapted for engagement with the female main chassis connector 16. The control head connector 25 includes contacts 26 associated with the variable circuit elements and additional contacts 27 associated with the additional circuit elements in the control head.

In operation of the mobile communications unit without the supervisory apparatus of the present invention, control head connector 25 is engaged with the main chassis connector, so that contacts 26 and 27 are engaged with corresponding ones of the contacts 16 and 17. Thus, the variable circuit elements are connected to the operative components of the mobile unit. Switch 21 is connected across power supply contacts 16a and 16e, volume control variable resistor 22 is connected across volume contacts 16b and 16c, and squelch control variable resistor 22 is connected between squelch main contact 16f and the ground return contact 16h. The additional circuit elements in the control head are similarly connected to the operative elements of the unit via the control head connector and the main connector; for example, speaker 24 is connected across speaker contacts 17a and 17b.

Supervisory apparatus according to one embodiment of the present invention adapted for use with the illustrated mobile communications unit includes supervisory circuit elements corresponding to the adjustable circuit elements in the control head of the mobile unit. Thus, the apparatus includes a jumper 28 (corresponding to switch 21), a fixed volume control resistor 30 (corresponding to variable volume control resistor 22), and a fixed squelch resistor 32 (corresponding to squelch variable resistor 23). These supervisory circuit elements are mounted within a supervisory circuit enclosure 34. A multicontact supervisory/main connector 35 is mounted on a cable extending from the supervisory circuit enclosure 34. Supervisory/main connector 35 is a male plug of the same configuration as control head connector 25; the supervisory/main connector includes contacts 36 and additional contacts 37 corresponding to the contacts 26 and additional contacts 27 of control head connector 25. The supervisory apparatus also includes supervisory/control head connector 45, a female plug of the same configuration as main chassis connector 15, supervisory/control head connector 45 includes contacts 46 and additional contacts 47 corresponding to the contacts 16 and contacts 17 additional of the main chassis connector. Additional contacts 47 of the supervisory/control head connectors are permanently connected to the corresponding additional contacts 37 of the supervisory/main connector.

A spring-loaded, relay-actuated, multiple switch 50 is also disposed within supervisory circuit enclosure 34. In the normal condition of the relay-actuated switch, illustrated in solid lines, contacts 46 of the supervisory/control head connector are are disconnected from the corresponding contacts 36 of the supervisory/main connector, and supervisory circuit elements 28, 30, and 32 are connected to the contacts 36 of connector 35. Conversely, when the relay-actuated switch 50 is in the bypass or override position indicated in broken lines, contacts 46 of the supervisory/control head connector are connected to the corresponding contacts 36 of supervisory/main connector 35, and the supervisory circuit elements are disconnected from the supervisory/main connectors 36.

A single pole actuation switch 54 is disposed within supervisory circuit housing enclosure 34 and is mechanically connected to a mechanical lock 56 so that actuation switch 54 can be closed only by operation of lock 56, and hence can be operated only by an authorized person having the key for the lock. Actuation switch 54 is connected in series with the coil 52 of relay switch 50, these series connected elements being connected across supervisory/main contacts 36a and 36f.

In use, the supervisory/main connector 35 is plugged into main chassis connector 15. Control head connector 25 is plugged into supervisory/control connector 45. With the relay-actuated switch in the normal position illustrated, the variable circuit elements in the control head are not connected to the operative elements 14 of the transceiver. Thus, the operator-adjustable controls 18, 19 and 20 on the control head are disabled. However, the additional circuit elements in the control head, such as speaker 24, are connected via additional contacts 27, 47, 37, and 17 to the operative elements of the circuit and hence function in the normal manner. The supervisory circuit elements 28, 30, and 32 are connected to the operative elements 14 of the transceiver in place of variable circuit elements 21, 22 and 23. These supervisory circuit elements thus fix the operating parameters of the transceiver: Thus, jumper 28 fixes the on-off control in the on condition by continuously connecting unswitched power contact 16e with switched power contact 16a on the main unit. Fixed volume control resistor 30 provides a fixed value for resistance between volume control contacts 16b and 16c, and fixed squelch resistor 32 maintains a fixed value of resistance between squelch circuit contact 16d and ground contact 16f. The values of resistors 30 and 32 are selected so that with these resistances in the circuits, the transceiver is in an operative mode, i.e., with these resistances, the transceiver will provide effective communications in its intended use. Adjustment of the operator-adjustable controls on the control head 12 cannot interfere with operation of the transceiver.

Relay coil 52 does not draw current when the apparatus is left in its normal condition, with the supervisory circuit elements connected. The relay coil will draw power only during unusual periods, such as test operation by supervisors, when the relay is operated to override the system to its bypass function. Moreover, the apparatus will remain in its normal condition, with the supervisory circuit elements connected and the operator-adjustable controls disabled, when power to the mobile unit and power to the supervisory control apparatus is interrupted. Thus, where the supervisory apparatus is used in connection with a vehicle- mounted mobile unit powered by the vehicle power supply, the selector means will remain in normal position, and the operator-adjustable controls will remain disabled even when the vehicle power system is turned off.

An authorized person possessing the key to lock 56 cn close switch 54, thereby imposing the power supply voltage across coil 52 of the electrically-actuated switch 50, whereby the electrically-actuated switch is moved to the override position indicated in broken lines. In this position, the variable circuit elements 21, 22, and 23 are connected via connector 26, 46, 36, and 16 to the operative elements 14 of the transceiver, thereby re-enabling the operator-adjustable controls on control head 12. In this position of the electrically-actuated relay switch, the transceiver operates substantially as though the supervisory apparatus were absent.

As will be readily appreciated, the supervisory apparatus could, at least theoretically, be defeated by a willful operator removing the supervisory apparatus from the transceiver and reconnecting the control head in the normal fashion. However, such willful tampering typically is not a problem with most installations. The effort required to engage in such tampering is typically enough to deter the operator from engaging in it. Further to deter such tampering, the connections between the supervisory apparatus and the transceiver may be provided with locks or tamper-evident seals (not shown).

As illustrated in FIG. 2, the system may include a plurality of vehicles 60 operating at different distances from the base station. To optimize operation of the transceivers in these different vehicles, different values of resistance may be provided in the fixed squelch resistor 32, the supervisory apparatus associated with each vehicle. Thus, a lower value for the fixed squelch resistor is provided for vehicle 60a, operating farther from the base station, than provided for vehicle 60b, operating close to the base station. Thus, the transceiver associated with vehicle 60a is maintained in a more sensitive state than that associated with vehicle 60b.

As will be readily appreciated, numerous variations and combinations of the features set forth abaove can be utilized without departing from the present invention as set forth in the claims appended hereto. Merely by way of example, the supervisory circuit elements need not be fixed or invariant circuit elements. Thus, resistors 30 and 32 in the embodiment of FIG. 1 could be variable resistors. As the variable resistors are disposed within the supervisory circuit housing at a location normally inaccessible to the operator, and are not associated with operator-adjustable controls 18, 19 and 20, the variable resistors would not be subject to misadjustment. Variable resistors in the supervisory circuit may be used, for example, to provide different conditions for different units, the values of the variable resistors being set by supervisory personnel during installation of the supervisory apparatus.

As will be readily appreciated, the configuration of the supervisory apparatus will vary according to the configuration of the transceiver or other mobile communication unit. For example, where the operator-adjustable controls of the mobile unit include a frequency selector control associated with an adjustable circuit element in the form of a multi-position switch for making different connections to select, the various frequencies, the supervisory apparatus may include a fixed jumper to replace the multi-position switch and thus fix the frequency selection parameter of the unit. Likewise, a signaling tone function control associated with adjustable circuit elements in the form of a switch for turning the tone function on and off and a variable resistor for control of tone volume can be disabled and the tone on/off and tone volume parameters can be fixed by supervisory circuit elements such a a fixed jumper and a fixed resistor.

Also, the physical configuration of the supervisory apparatus may differ from that described above. Thus, where the entire mobile telecommunications unit is mounted in a readily accessible location such as on the dashboard of a vehicle, it may be desirable to incorporate the supervisory circuitry within the main chassis enclosure of the unit itself. Although the supervisory apparatus and method of the present invention are particularly well suited for use with two-way communication systems, the same can also be used with one-way communication systems, i.e., with mobile receivers arranged to receive signals from the base station. Accordingly, the foregoing description of the preferred embodiments should be taken by way of illustration rather than by way of limitation of the present invention, as set forth in the claims.

What is claimed is:

1. A method of providing supervision to prevent operator-induced disruption of a telecommunication system including a mobile unit having operator-adjustable controls for altering operating parameters of said mobile unit which control receipt of messages by said mobile unit, the method comprising the steps of disabling said operator adjustable controls and fixing said operating parameters of said mobile unit which control receipt of messages by said mobile unit to maintain the mobile unit in operation for receipt of messages despite attempted adjustment of said operator-adjustable controls.

2. A method of providing supervision to prevent operator-induced disruption of a telecommunication system including a mobile unit having operator-adjustable controls for altering the operating parameters of said mobile unit, the method comprising the steps of disabling said operator adjustable controls and fixing said operating parameters of said mobile unit to maintain the mobile unit in operation despite attempted adjustment of said operator-adjustable controls, the operating parameters fixed in said fixing step including on-off selection, squelch level and volume.

3. A method as claimed in claim 2 wherein said operating parameters also include frequency selection and tone function.

4. A method as claimed in claim 1 wherein said system includes a plurality of said mobile units for use under a plurality of different operating conditions, said disabling step including the step of disabling said operator-adjustable controls in each of said mobile units, said fixing step including the step of fixing at least one of said operating parameters of different ones of said mobile units at different values to adapt said different ones of said mobile units for operation under said different conditions.

5. A method of providing supervision to prevent operator-induced disruption of a telecommunication system including a mobile unit having operator-adjustable controls for altering the operating parameters of said mobile unit, the method comprising the steps of disabling said operator adjustable controls and fixing said operating parameters of said mobile unit to maintain the mobile unit in operation despite attempted adjustment of said operator-adjustable controls, said system including a plurality of said mobile units for use under a plurality of different operating conditions, said disabling step including the step of disabling said operator-adjustable controls in each of said mobile units, said fixing step including the step of fixing at lesat one of said operating parameters of different ones of said mobile units at different values to adapt said different ones of said mobile units for operation under said different condition, said different operating conditions including operation at different distances from a base station, the squelch levels of different ones of said mobile units being fixed at different values in said fixing step.

6. A method as claimed in claim 1 wherein said mobile unit includes adjustable circuit elements associated with said operator-adjustable controls for adjustment by means of said controls, said disabling step including the step of disconnecting said adjustable circuit elements from the operative circuit elements of the mobile unit and connecting to said operative elements supervisory circuit elements corresponding to said adjustable circuit elements but not adjustable by said controls.

7. A method of providing supervision to prevent operator-induced disruption of a telecommunication system including a mobile unit having operator-adjustable controls for altering the operating parameters of said mobile unit, the method comprising the steps of disabling said operator-adjustable controls and fixing said operating parameters of said mobile unit to maintain the mobile unit in operation despite attempted adjustment of said operator-adjustable controls, said mobile unit including adjustable circuit elements associated with said operator-adjustable controls for adjustment by means of said controls, said disabling step including the step of disconnecting said adjustable circuit elements from the operative circuit elements of the mobile unit and connecting to said operative elements supervisory circuit elements corresponding to said adjustable circuit elements but not adjustable by said controls, said mobile unit including a main chassis having the operative circuit elements mounted thereon, a control head having said operator-adjustable controls mounted thereon and having said adjustable circuit elements mounted therein, said adjustable circuit elements being connected to said operative elements on said main chassis by a control head connector associated with said control head and releasably mated with a main chassis connector associated with said main chassis, said disabling step including the step of disconnecting said control head connector from said main chassis connector, said step of connecting said supervisory circuit elements to said operative elements including the step of connecting a supervisory/main connector to said main chassis connector.

8. A method as claimed in claim 7, wherein said control head also includes additional circuit elements not associated with said operator adjustable controls, and said supervisory circuit elements are incorporated in a supervisory apparatus having a supervisory/control head connector of the same configuration as said main chassis connector, the method further comprising the step of connecting said control head connector to said supervisory/control head connector so that said additional circuit elements are connected to said operative elements through said supervisory/control head connector and said supervisory/main connector.

9. Supervisory apparatus for preventing operator-induced failures of a mobile telecommunications unit having operator-adjustable controls for altering operating parameters of the unit which control receipt of messages by said mobile unit, said apparatus comprising disabling means for disabling said operator-adjustable controls and fixing means for fixing said operating parameters of the mobile unit which control receipt of messages by said mobile unit so as to maintain the unit in operation for receipt of messages despite adjustment of said controls.

10. Supervisory apparatus for preventing operator-induced failures of a mobile telecommunications unit having operator-adjustable controls for altering the operating parameters of the unit, said apparatus comprising disabling means for disabling said operator-adjustable controls, fixing means for fixing said operating parameters of the unit so as to maintain the unit in operation despite adjustment of said controls, selectively operable override means for bypassing said fixing means and overriding said disabling means so as to enable said operator-adjustable controls, and lock means for preventing actuation of said override means by unauthorized individuals.

11. Supervisory apparatus as claimed in claim 10 for use with a mobile telecommunications unit having operative circuit elements mounted in a main chassis, having a control head and having and having variable circuit elements in said control head associated with said operator-adjustable controls, the unit also having a multicontact main chassis connector attached to said main chassis and a multicontact control head connector attached to said control head and mateable with said main chassis connector, the supervisory apparatus including a multicontact supervisory/main connector, and a multicontact supervisory/control head connector of the same configuration as said main chassis connector, whereby the supervisory apparatus may be connected between said control head and said main chassis by said connectors, said fixing means including supervisory circuit elements normally connected to contacts of said supervisory/main connector, said override means including means for disconnecting said supervisory circuit elements from said supervisory/main connector and connecting contacts of said supervisory/control head connector to contacts of said supervisory/main connector to thereby connect said variable circuit elements in said control head operative elements in said main chassis.

* * * * *